United States Patent
Arakawa et al.

(10) Patent No.: US 8,370,593 B2
(45) Date of Patent: Feb. 5, 2013

(54) METHOD AND APPARATUS TO MANAGE GROUPS FOR DEDUPLICATION

(75) Inventors: Hiroshi Arakawa, Sunnyvale, CA (US); Yasunori Kaneda, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 12/760,003

(22) Filed: Apr. 14, 2010

(65) Prior Publication Data
US 2011/0258404 A1  Oct. 20, 2011

(51) Int. Cl.
*G06F 12/16* (2006.01)

(52) U.S. Cl. ........ 711/162; 711/161; 711/170; 711/216; 711/E12.103

(58) Field of Classification Search .................. None
See application file for complete search history.

(56) References Cited

U.S. PATENT DOCUMENTS

| | | | | |
|---|---|---|---|---|
| 7,072,910 | B2 * | 7/2006 | Kahn et al. ................ | 707/639 |
| 2008/0005201 | A1 * | 1/2008 | Ting et al. ................ | 707/204 |
| 2008/0243953 | A1 * | 10/2008 | Wu et al. ................ | 707/204 |
| 2009/0132619 | A1 | 5/2009 | Arakawa et al. | |

OTHER PUBLICATIONS

3PAR, "Endless Data Flexibility at Minimal Cost", 3PAR Virtual Copy, Software, 3PAR Inc., 2009, Fremont, CA.

* cited by examiner

*Primary Examiner* — Edward Dudek, Jr.
*Assistant Examiner* — Ralph A Verderamo, III
(74) *Attorney, Agent, or Firm* — Mattingly & Malur, P.C.

(57) ABSTRACT

A storage system comprises one or more pool volumes having chunks for storing data; one or more primary volumes; writable snapshots as virtual volumes for each primary volume which is a common ancestor of the writable snapshots, each primary volume and corresponding writable snapshots being members forming a snapshot group; and a storage controller which includes a processor, a memory storing, for each snapshot group, group information of the members within the snapshot group, and a deduplication module. The deduplication module may identify a snapshot group for deduplication based on the group information and perform deduplication of data for the identified snapshot group in a deduplication area, or perform deduplication of data in a deduplication area which is specified based on the group information of a snapshot group being generated in the storage system.

20 Claims, 13 Drawing Sheets

| Parent Volume ID | Snapshot ID | Volume ID | Date & Time |
|---|---|---|---|
| 0 | 0 | 100 | 2006/12/24 1:00:00 am |
|  | 1 | 101 | 2006/12/24 2:00:00 am |
|  | 2 | 102 | 2006/12/24 3:00:00 am |
|  | : | : | : |
| 1 | 0 | 200 | 2006/12/24 1:00:00 am |
|  | 1 | 201 | 2006/12/24 2:00:00 am |
|  | 2 | 202 | 2006/12/24 3:00:00 am |
|  | : | : | : |
| : |  |  |  |

Fig. 3

| Parent Volume ID | Snapshot ID | Segment ID | Pool Volume ID | Chunk ID |
|---|---|---|---|---|
| 0 | 0 | 0 | 12 | 56 |
|  |  | 2 | 34 | 78 |
|  |  | 3 | 23 | 29 |
|  |  | : |  |  |
|  | 1 | 0 | 31 | 77 |
|  |  | 1 | 22 | 90 |
|  |  | 3 | 11 | 18 |
|  |  | : |  |  |
| : | : |  |  |  |

Fig. 4

| Pool Volume ID | Chunk ID | Usage | Hash value | Number of links |
|---|---|---|---|---|
| 0 | 0 | In Use | a88d359a25a117bfdfffe9d ef486761070885e3c | 1 |
|  | 1 | Free | - | - |
|  | 2 | In Use | 2843dd45eab33b477ce19 73da48f9274fdd3458e | 3 |
|  | : |  |  |  |
| 1 | 0 | In Use | 4f9ec88d32ab8b652dc44f 2f828537dfe98ac889 | 5 |
|  | 1 | In Use | 1f6d6637c06ebb2f8c3545 33ec17a48dea3d9808 | 2 |
|  | 2 | Free | - | - |
|  | : |  |  |  |
| : |  |  |  |  |

Fig. 5

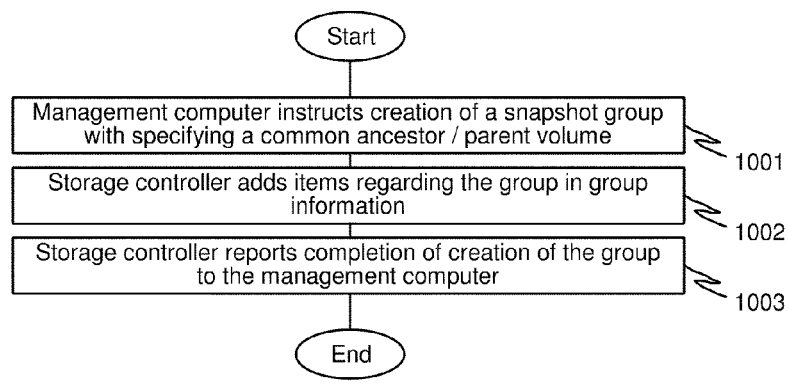
Fig. 7
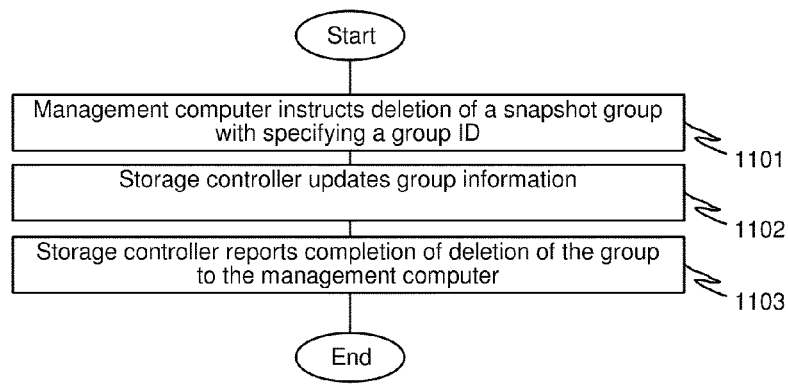
Fig. 8
Fig. 9

METHOD AND APPARATUS TO MANAGE GROUPS FOR DEDUPLICATION

BACKGROUND OF THE INVENTION

The present invention relates generally to storage systems and, more particularly, to a method and an apparatus for the management of scope of deduplication.

Recently, the use of virtual servers has been popularized in enterprises. Server virtualization realizes the improvement of manageability and server resource utilization as well as quick deployment of servers. With server virtualization, multiple virtual servers (i.e., virtual computing machines) can run on a single physical server.

Each virtual server image that is data enabling to establish the virtual server can be categorized and have some similarity in each category, because virtual server images for servers using the same software (e.g., OS and application software) are similar to each other. Therefore, to prepare a large number of virtual server images, writable snapshot provided by storage systems is applied. With this method, an original model of a virtual server image having a specific set of software such as OS and application software is prepared as "Gold Image" first, and then multiple snapshots of the "Gold Image" are created as bases of virtual server images. For the deployment of the images as actual virtual servers, additional modification is performed to each snapshot because the virtual servers have custom setup and variation. The difference data among the images is stored with the virtual server images in the storage systems. When the number of virtual server becomes large, the total amount of the data can be huge.

In order to avoid the complexity of data management and excessive storage cost, data reduction is required and deduplication is used as a method to reduce the amount of data possessed by enterprises. As shown in U.S. Pat. No. 7,870,105, with the deduplication technique, data to be stored in a storage system is compared with each other, and one is replaced with link information that indicates the other if these data are identical. By using this technique, the amount of data stored in the storage system can be reduced. See also, U.S. Patent Publication US2010/0199065. The entire disclosures of these two applications are incorporated herein by reference.

Because the comparison process for a large amount of data causes excessive use of computing resources such as processors and memory (including a key table for the comparison), a manner to limit the target (scope) of the comparison in the deduplication process is necessary to achieve reasonable use of the resources and fine performance of deduplication. In addition, the limitation should be realized according to data classification from the equivalent or similar perspective in order to gain effectiveness of data reduction by deduplication.

BRIEF SUMMARY OF THE INVENTION

Exemplary embodiments of the invention provide a method and an apparatus to provide and manage groups (scope) of deduplication. With the present invention, a storage system that possesses writable snapshot capability and deduplication capability provides one or more groups as scope of deduplication according to the parent-child relationship (i.e., ancestry or family tree) of writable snapshots. When the storage system receives an instruction including a designation of a snapshot from a management computer, the storage system creates a group including the snapshot and its child (descendant) snapshots as a collection of containers having similar data because they can be a "Gold Image" and its variations. In the deduplication process, the storage system uses each group as a scope of the deduplication. With the invention, reasonable use of resources and fine performance in the deduplication process are achieved for an environment that applies writable snapshots to prepare virtual server images for virtual servers.

In accordance with an aspect of the present invention, a storage system comprises one or more pool volumes having chunks for storing data; one or more primary volumes; a plurality of writable snapshots as virtual volumes for each primary volume which is a common ancestor of the writable snapshots, each primary volume and corresponding writable snapshots being members forming a snapshot group; and a storage controller which includes a processor, a memory storing, for each snapshot group, group information of the members within the snapshot group, and a deduplication module to identify a snapshot group for deduplication based on the group information, and to perform deduplication of data for the identified snapshot group in a deduplication area.

In some embodiments, the storage controller calculates hash values of the chunks of pool volumes corresponding to the writable snapshots in the identified snapshot group, and the deduplication area is specified based on the hash value of the chunk of pool volume associated with the deduplication area. In response to a write request received by the storage system to write to a writable snapshot of the plurality of writable snapshots, the deduplication module performs the deduplication of data in the deduplication area, for the identified snapshot group which contains the writable snapshot of the write request, if a hash value of write data for the write request is same as the hash value of the chunk of pool volume associated with the deduplication area and if the write data of the write request is same as data in the chunk of pool volume having the same hash value as the write data of the write request, and the storage controller allocates a chunk of pool volume for the write data, if the hash value of write data of the write request does not match the hash value of any of the chunks of pool volume corresponding to the writable snapshots in the identified snapshot group. The deduplication module may perform the deduplication of data either before or after the storage controller stores the write data of the write request in the storage system.

In specific embodiments, a snapshot group is formed by one of the writable snapshots as an ancestor snapshot and a plurality of the writable snapshots to which the ancestor snapshot is a common ancestor. The members of the snapshot group are changed in creation or deletion of a snapshot if the snapshot group is related to the snapshot.

In accordance with another aspect of the invention, a storage system comprises one or more pool volumes having chunks for storing data; one or more primary volumes; a plurality of writable snapshots as virtual volumes for each primary volume which is a common ancestor of the writable snapshots, each primary volume and corresponding writable snapshots being members forming a snapshot group; and a storage controller which includes a processor, a memory storing, for each snapshot group, group information of the members within the snapshot group, and a deduplication module to perform deduplication of data in a deduplication area which is specified based on the group information of a snapshot group being generated in the storage system.

In some embodiments, the storage controller calculates hash values of the chunks of pool volumes corresponding to the writable snapshots in the snapshot group; and the deduplication area is specified based on the calculated hash values. In response to a write request received by the storage system to write to a target snapshot of the plurality of writable snapshots, the deduplication module performs the deduplication of data in the deduplication area, for the snapshot group which contains the target snapshot of the write request, if a hash value of write data for the write request is same as the hash value of the chunk of pool volume associated with the deduplication area and if the write data of the write request is same as data in the chunk of pool volume having the same hash value as the write data of the write request; and the storage controller allocates a chunk of pool volume for the write data, if the hash value of write data of the write request does not match the hash value of any of the chunks of pool volume corresponding to the writable snapshots in the snapshot group which contains the target snapshot.

These and other features and advantages of the present invention will become apparent to those of ordinary skill in the art in view of the following detailed description of the specific embodiments.

BRIEF DESCRIPTION OF THE DRAWINGS

FIG. 3 shows an example of the snapshot information.

FIG. 4 shows an example of the write data information.

FIG. 5 shows an example of the pool information.

FIG. 7 shows an example of the group information.

FIG. 8 is an example of a flow diagram illustrating a process to create a group.

FIG. 9 is an example of a flow diagram illustrating a process to delete a group.

DETAILED DESCRIPTION OF THE INVENTION

Figure 1:
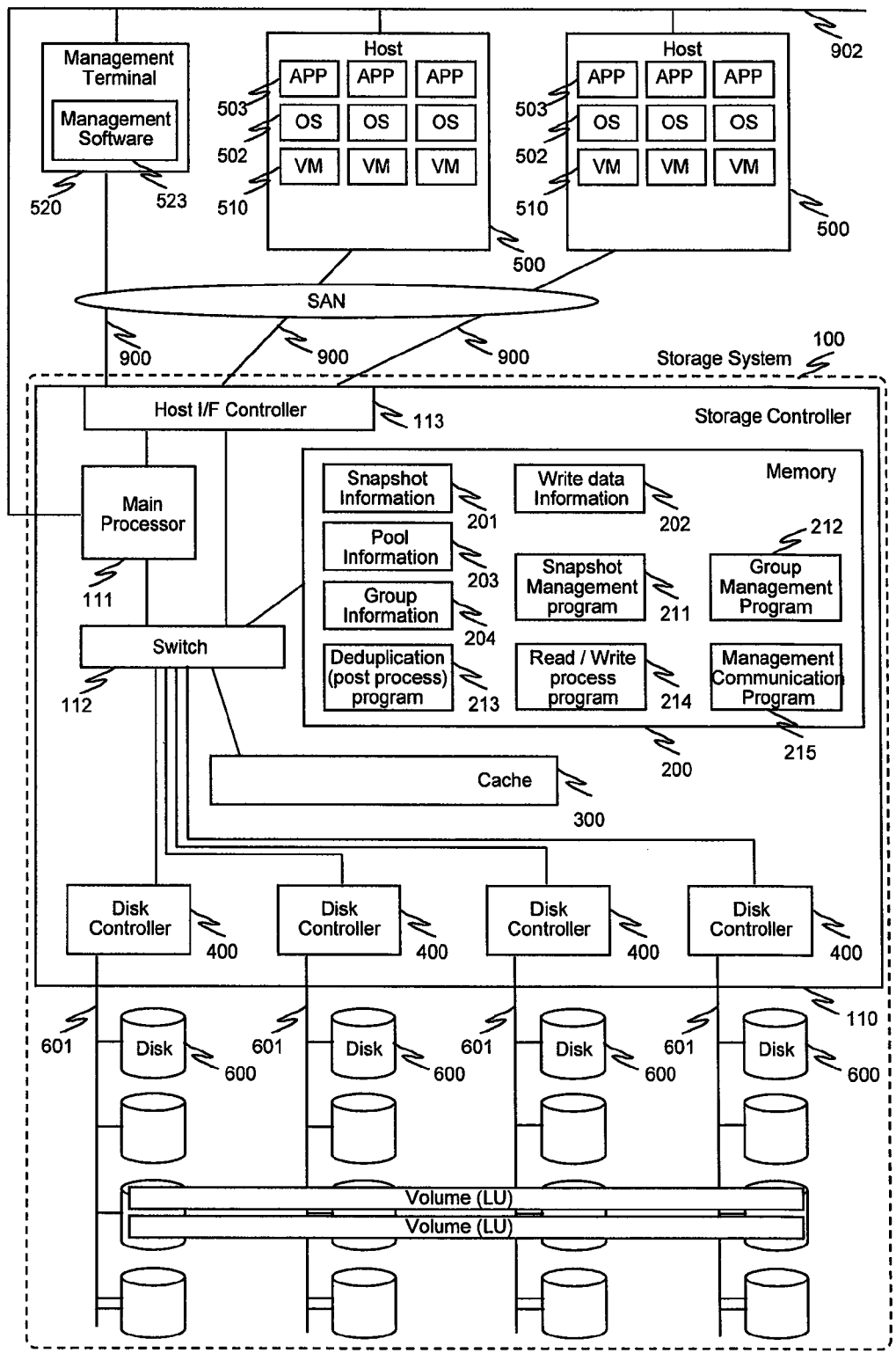
FIG. 1 illustrates an example of a hardware configuration of an information system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for the management of scope of deduplication.

A. System Configuration

FIG. 1 illustrates an example of a hardware configuration of an information system in which the method and apparatus of the invention may be applied. The system includes a storage system 100 coupled via a network 900 such as SAN to one or more hosts 500 and a management terminal 520.

The storage system 100 includes a storage controller 110, a main processor 111, a switch 112, a host interface 113, a memory 200, a cache 300, disk controllers 400, disks 600 (e.g., HDD), and backend paths 601 (e.g., Fibre Channel, SATA, SAS, or iSCSI (IP)). The main processor 111 performs various processes regarding the storage controller 110. The main processor 111 and other components use the following information stored in the memory 200: snapshot information 201, write data information 202, pool information 203, and group information 204. The main processor 111 performs the processes by executing the following programs stored in memory 200: snapshot management process program 211, group management process program 212, deduplication (post process) program 213, read/write process program 214, and management communication program 215. The details of these processes are described later. The volumes (Logical Units) provided by the storage system 100 are produced from a collection of areas in the HDDs. They may be protected by storing parity code (i.e., by RAID configuration) or mirroring.

The host 500 and management computer 520 are connected to the host interface 113 via the SAN 900 (e.g., Fibre Channel, Fibre Channel over Ethernet, or iSCSI (IP)). The hosts 500 and management computer 520 and storage controller 110 are connected with each other via a LAN 902 (e.g., IP network). The host 500 has one or more virtual servers comprising a virtual machine 510, an OS 502, and an application program 503. To run these programs, the host 500 also has resources such as a processor, a memory, and storage devices not shown in FIG. 1.

The management computer 520 has a file system, an OS, and a management program 523. To run these programs, the host 500 also has resources such as a processor, a memory, and storage devices not shown in FIG. 1.

B. Overview of Writable Snapshot

Figure 2:
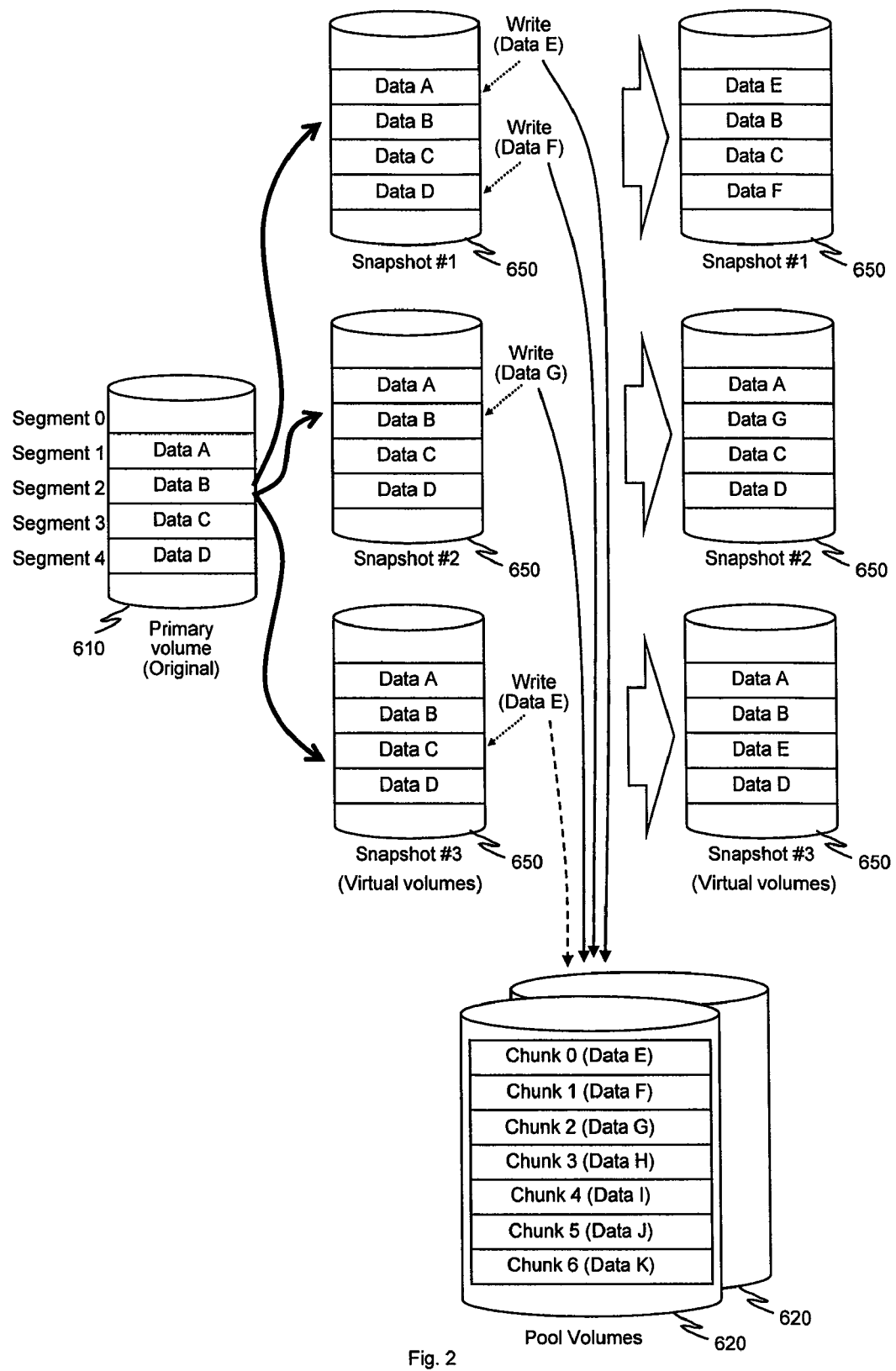
FIG. 2 is a schematic diagram illustrating the structure and method to provide writable snapshots.

As described below, the storage system 100 provides writable snapshot volumes 650. FIG. 2 illustrates the structure and method to provide writable snapshots. In FIG. 2, the storage system 100 provides a primary volume 610 and its multiple snapshots in a manner described in U.S. Patent Publication US2008/0282047, which is incorporated herein by reference in its entirety. That is, the snapshots are provided as virtual volumes. In the example shown in FIG. 2, the host 500 can write data to each snapshot volume 650 and each write data is stored in pool volumes 620. Because the storage system 100 maintains write data information 202 as information regarding relation between segments (i.e., logical areas) of each snapshot volume 650 and chunks (i.e., divided areas of fixed size) that store write data in the pool volume 620, the storage system 100 can provide snapshots 650 as virtual volume consisting of contents of the primary volume 610 and pool volumes 620 as shown in FIG. 2. That is, these snapshots 650 are writable and can maintain write data as well as ordinary volumes. The primary volume 610 may be read-only volume or may process write access with copy on write manner mentioned in U.S. Patent Publication US2008/0282047.

FIG. 3 shows an example of the snapshot information 201 having information about each snapshot, such as snapshot ID of each snapshot, volume ID of parent (primary) volume of each snapshot, and volume ID of each snapshot.

FIG. 4 shows an example of the write data information 202 mentioned above. This information maintains relationship between the logical area (segment) in snapshot and the actual location of write data in the pool volume 620. The actual location of the write data is specified by pool volume ID and chunk ID. This information can be constructed as a list or directory of each element to search the actual location of write data quickly.

FIG. 5 shows an example of the pool information 203. This information manages whether a chunk is used or not. By using this information, the storage controller 110 is able to find free (unused) chunks in the processes described below. This information also maintains the hash value and number of links regarding each chunk in use. The hash value is a value used to detect the same data. The hash value is a semi-unique value for data in each chunk, and the size of the value is smaller than the size of the chunk itself. Therefore, the hash value is easy to compare and suitable to use for detecting the same data. The hash value is generated by hash function such as SHA-1 and SHA-256. The number of links means the number of relations between chunk (i.e., physical area) and segment (i.e., logical or virtual area) shown in FIG. 2. "Usage" in this information shows current usage of each chunk (i.e., physical area). This information can be constructed as a list or directory of each element to search a free chunk quickly.

C. Snapshot Group

Figure 6:
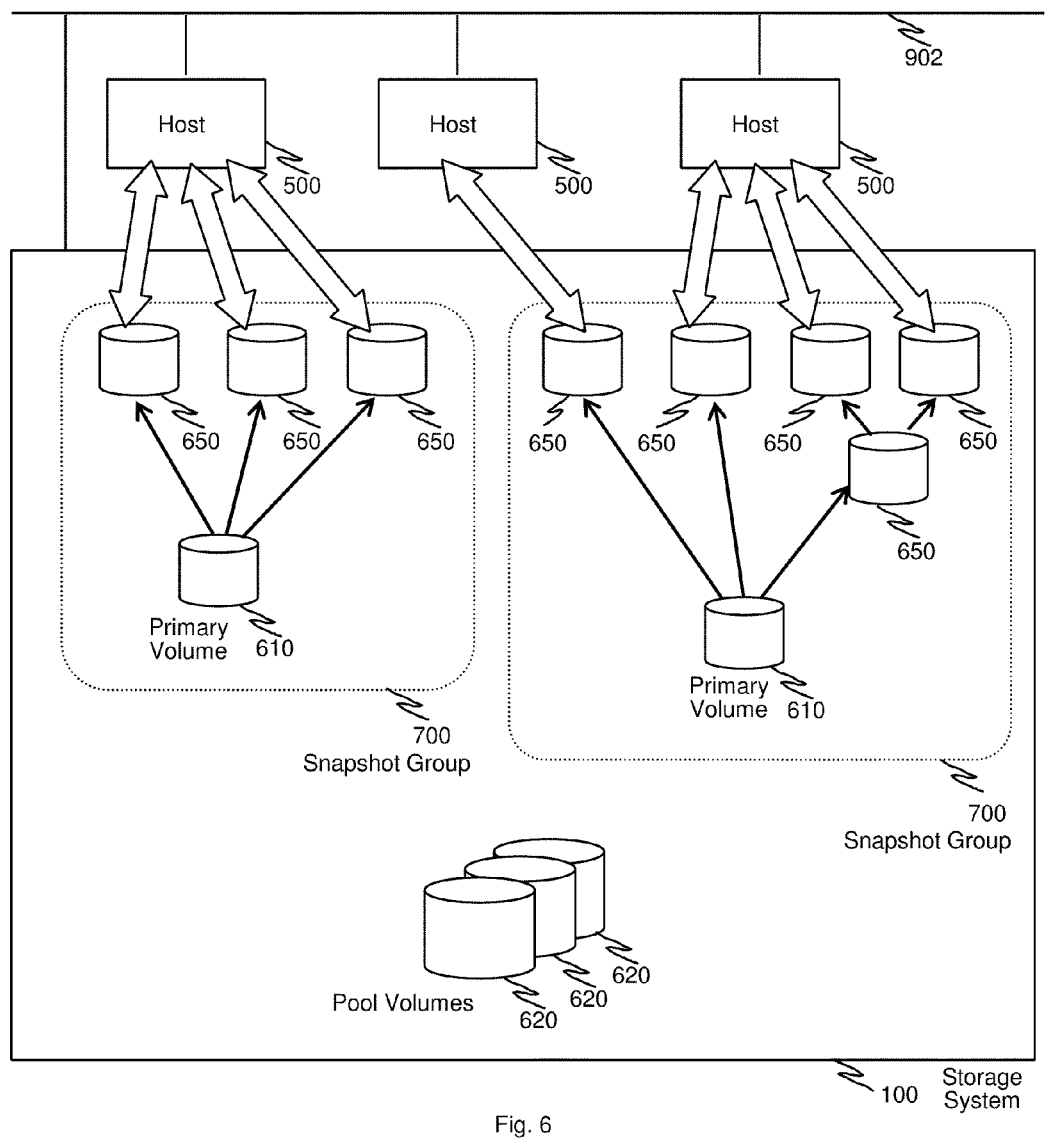
FIG. 6 is a schematic diagram illustrating a storage system for providing pool volumes, primary volumes, and writable snapshots.

FIG. 6 is a schematic diagram illustrating a storage system for providing pool volumes, primary volumes, and writable snapshots. As shown in FIG. 6, in addition to having one or more pool volumes 620 and one or more primary volumes 610, the storage system 100 provides writable snapshots 650 of each primary volume 610. By storing one or more virtual server images in the primary volumes 610 (that is, each snapshot 650 stores one or more images virtually), each host 500 can generate write access and read access to the writable snapshots 650 in order to establish and run virtual servers on the host 500. The storage system 100 can also provide snapshots 650 of a snapshot 650. As explained below, the snapshots 650 can be grouped according to the parent-child relationship (i.e., ancestry or family tree) of snapshots 650. A snapshot 650 can be an origin (parent) to form a snapshot group 700 as well as a primary volume 610. The storage system 100 applies a snapshot group 700 as the scope of the deduplication process. The detailed processes are described below.

FIG. 7 shows an example of the group information 204. This information is used for the management of the snapshot groups mentioned above, and records group ID of each group, identifier of members of each group, and volume ID of common ancestor/parent volume. The common ancestor (or parent) volume means the origin of snapshots in the group 700.

D. Group Creation Process

FIG. 8 is an example of a flow diagram illustrating a process to create a group 700. At step 1001, the management computer 520 issues a request for creation of a group 700 with specifying a volume to be a common ancestor/parent volume of the group 700. At step 1002, according the received request, the storage controller 110 adds information to the group information 204 to create the specified group 700. At step 1003, the storage controller 110 reports completion of creation of the group 700 to the management computer 520.

E. Group Deletion Process

FIG. 9 is an example of a flow diagram illustrating a process to delete a group 700. At step 1101, the management computer 520 issues a request for deletion of a group 700 with specifying the ID of the group 700 to be deleted. At step 1102, according the received request, the storage controller 110 deletes information regarding the specified group from the group information 204. At step 1103, the storage controller 110 reports completion of deletion of the group 700 to the management computer 520.

F. Snapshot Creation Process

Figure 10:
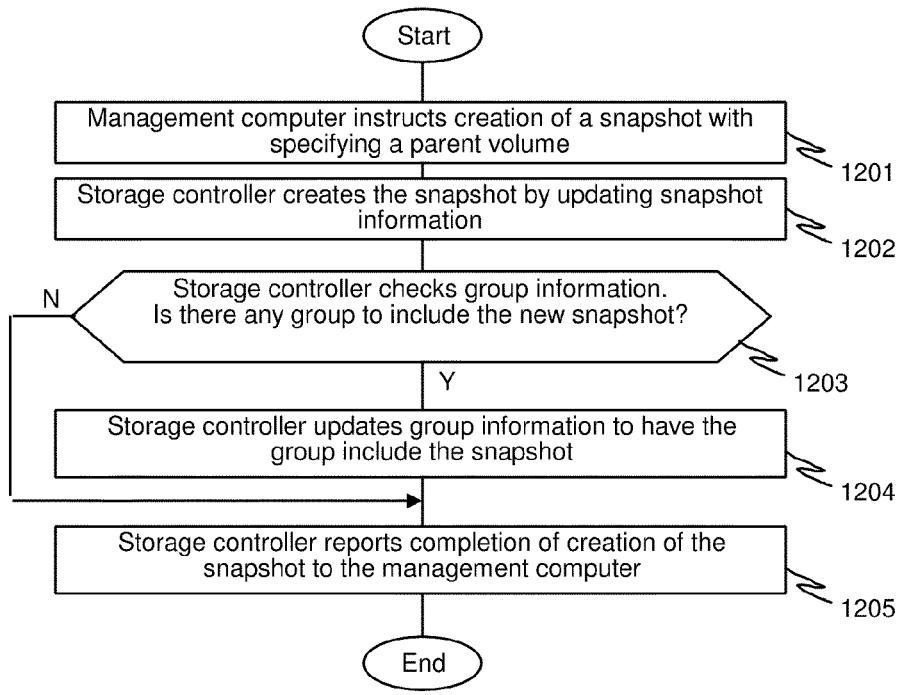
FIG. 10 is an example of a flow diagram illustrating a process to create a snapshot.

FIG. 10 is an example of a flow diagram illustrating a process to create a snapshot 650. At step 1201, the management computer 520 issues a request for creation of a snapshot 650 with specifying the ID of a volume to be a parent volume. A snapshot 650 can be the parent volume as well as an ordinary volume. At step 1202, according the received request, the storage controller 110 creates the snapshot by updating the snapshot information 201. At step 1203, by reference to the group information 204, the storage controller 110 inspects existence of a group 700 that should include the new snapshot 650. If the group 700 exists, the process proceeds to step 1204. Otherwise, the process proceeds to step 1205. At step 1204, the storage controller 110 adds the snapshot 650 to the group 700 by updating the group information 204. At step 1205, the storage controller 110 reports completion of creation of the snapshot 650 to the management computer 520. The management computer 520 can inform the host 500 that the snapshot 650 is available to establish and run one or more virtual servers.

G. Snapshot Deletion Process

Figure 11:
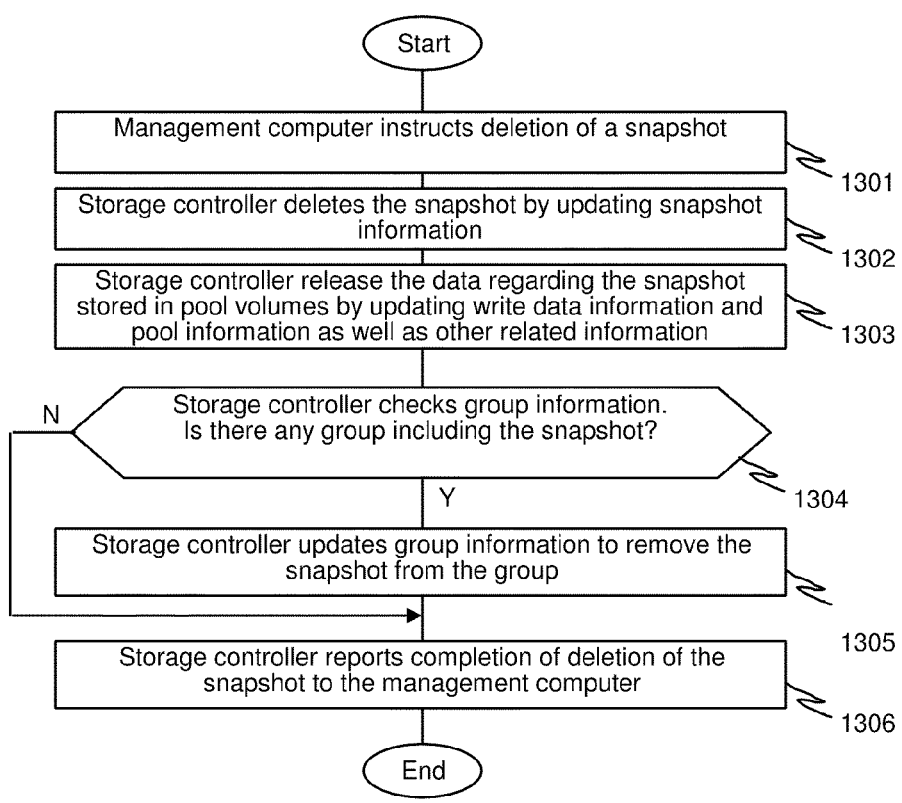
FIG. 11 is an example of a flow diagram illustrating a process to delete a snapshot.

FIG. 11 is an example of a flow diagram illustrating a process to delete a snapshot 650. At step 1301, the management computer 520 issues a request for deletion of a snapshot 650 with specifying an identifier (e.g., parent volume, snapshot ID, and/or volume ID) of the snapshot 650 to be deleted. Before issuing the request, the management computer 520 may make sure that the hosts 500 no longer use the snapshot 650. At step 1302, according the received request, the storage controller 110 removes information regarding the snapshot from the snapshot information 201. At step 1303, the storage controller 110 releases the data regarding the snapshot 650 stored in pool volumes 620 by updating the write data information 202 and pool information 203 as well as other related information. At step 1304, by reference to the group information 204, the storage controller 110 inspects existence of a group 700 having the snapshot 650. If the group 700 exists, the process proceeds to step 1305. Otherwise, the process proceeds to step 1306. At step 1305, the storage controller 110 deletes the snapshot 650 from the group 700 by updating the group information 204. At step 1306, the storage controller 110 reports completion of deletion of the snapshot 650 to the management computer 520.

H. Write Process For Writable Snapshot With Deduplication

In the following example of processes, the storage system 100 performs deduplication as a part of the process for handling a write request regarding a snapshot 650. As an example, in FIG. 2, the same data (Data E) is written twice (to Snapshot #1 and Snapshot #3); however, one data of Data E is stored in the pool volume 620 (in Chunk 0) with deduplication.

Figure 12:
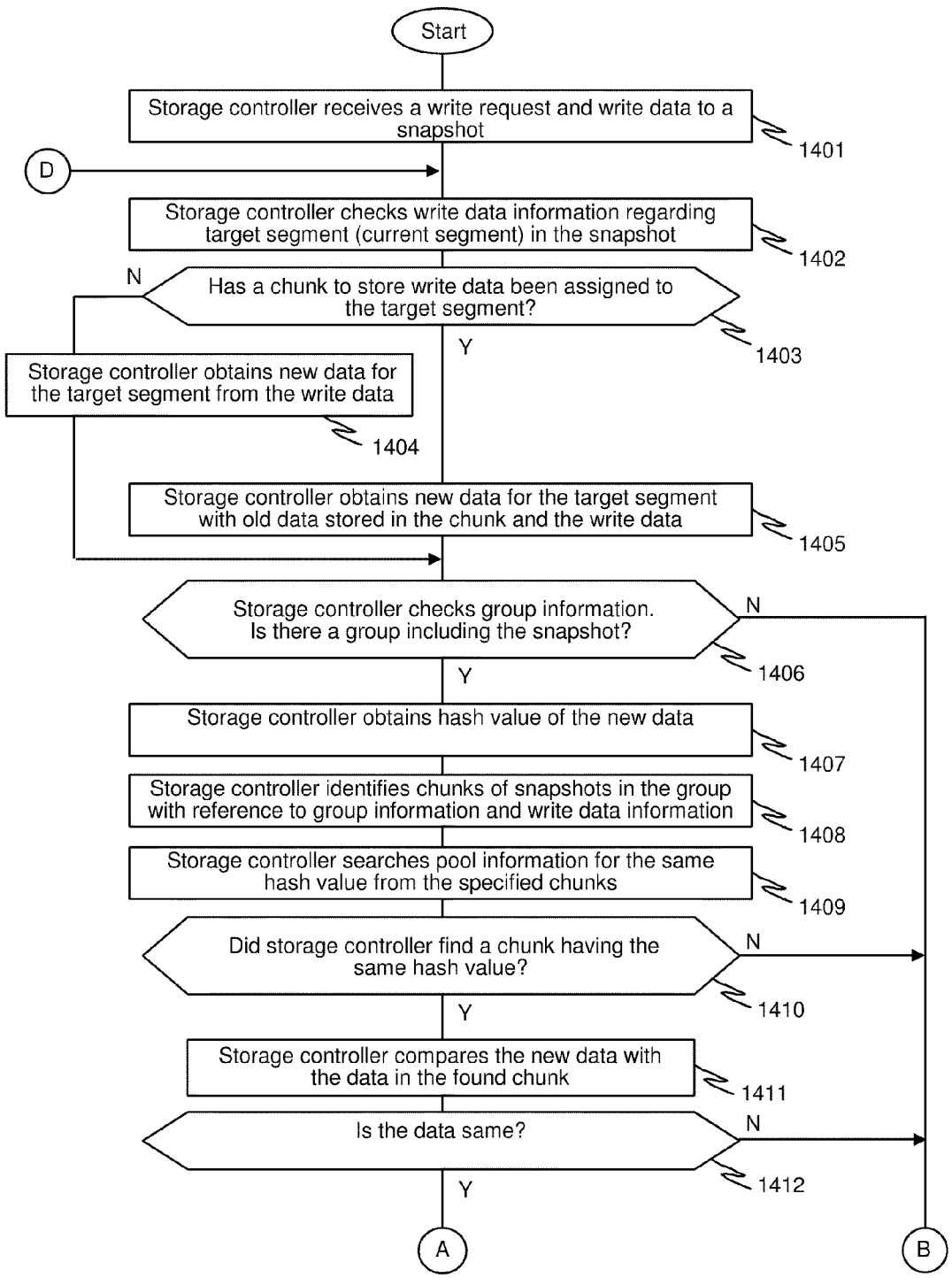
FIG. 12 is a flow diagram illustrating the first part of an exemplary write process.

FIG. 12 illustrates the first part of an exemplary write process. In the first part, the detection of duplication is performed. At step 1401, the storage controller 110 receives a write request and the associated data from the host 500 via the SAN 900. The storage controller 110 then takes the first segment of the target area specified in the write request as the current target segment to be processed. At step 1402, the storage controller 110 checks the write data information 202 with respect to the target segment. At step 1403, if the target segment has already had a corresponding chunk assigned, the storage controller 110 obtains new data for the target segment from the write data (step 1404). Otherwise, the storage controller 110 obtains the new data from the old data stored in the chunk and the write data (step 1405). At step 1406, by reference to the group information 204, the storage controller 110 inspects existence of a group 700 having the snapshot 650. If the group 700 exists, the process proceeds to step 1407. Otherwise, the process proceeds to step 1601 in FIG. 14.

At step 1407, the storage controller 110 calculates a hash value of the new data by means of a hash function. At step 1408, the storage controller 110 identifies chunks of snapshots 650 in the group 700 with reference to the write data information 202 and the group information 204. At step 1409, the storage controller 110 searches the pool information 203 for the same hash value from the specified chunks. At step 1410, if the storage controller 110 finds a chunk having the same hash value, the process proceeds to step 1411. Otherwise, the process proceeds to step 1601 in FIG. 14. At step 1411, the storage controller 110 compares the new data with the data in the found chunk by binary-level comparison. At step 1412, as the result of the comparison, if both data are the same, the process proceeds to step 1501 in FIG. 13. Otherwise, the process proceeds to step 1601 in FIG. 14.

Figure 13:
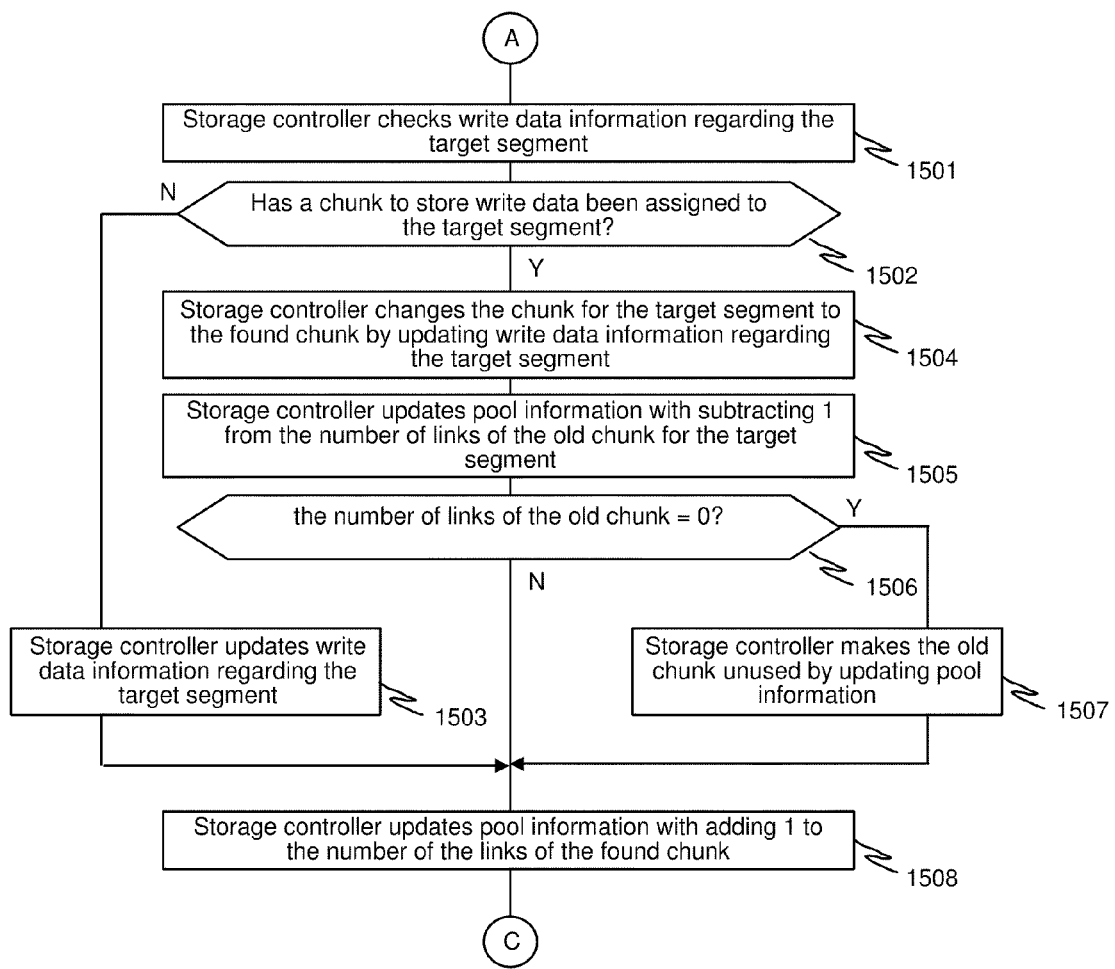
FIG. 13 is a flow diagram illustrating the second part of the exemplary write process.

FIG. 13 illustrates the second part of the exemplary write process. In the second part, a link (relation) is created or updated instead of physically storing the received data. At step 1501, the storage controller 110 checks the write data information 202 in order to locate the target segment. At step 1502, if the target segment has already had a corresponding chunk assigned, the process proceeds to step 1504. Otherwise, the storage controller 110 updates the write data information 202 to create a link between the target segment and the found chunk having the same data as the new data (step 1503). At step 1504, the storage controller 110 updates the write data information 202 by changing the chunk for the target segment to the found chunk having the same data. At step 1505, the storage controller 110 updates the pool information 203 by subtracting 1 from the number of links of the old chunk for the target segment. If the number of links of the old chunk equals to 0 at step 1506, the storage controller 110 updates the pool information 203 to label the old chunk as unused (step 1507). Otherwise, the process proceeds to step 1508. At step 1508, the storage controller 110 updates the pool information 203 by adding 1 to the number of links of the found chunk having the same as the new data. After that, the process proceeds to step 1701 in FIG. 15.

Figure 14:
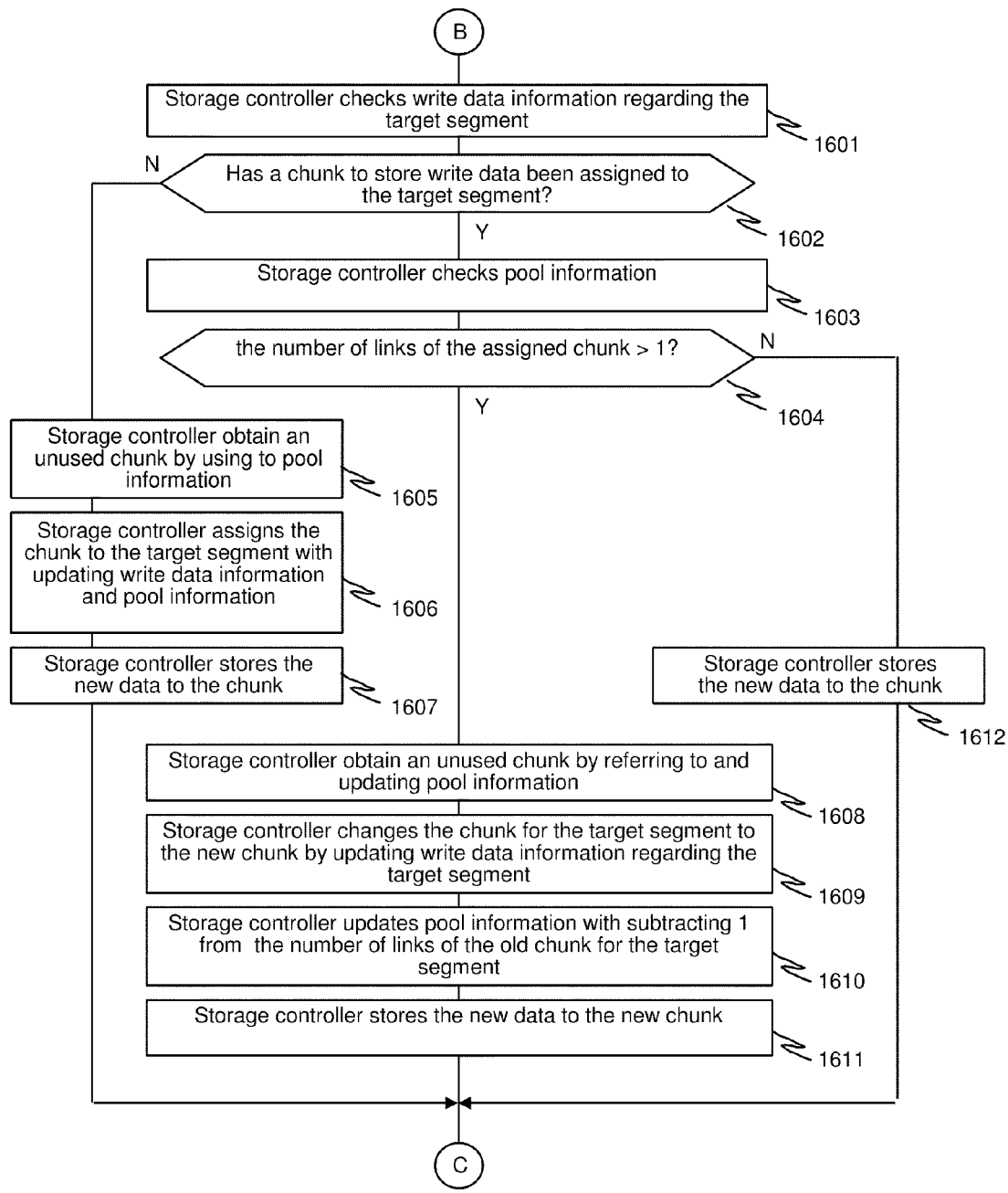
FIG. 14 is a flow diagram illustrating the third part of the exemplary write process.

FIG. 14 illustrates the third part of the exemplary write process. In the third part, the write data is physically stored. At step 1601, the storage controller 110 checks the write data information 202 with respect to the target segment. At step 1602, if the target segment has already had a corresponding chunk assigned, the process proceeds to step 1603. Otherwise, the process proceeds to step 1605. At step 1603, the storage controller 110 checks the pool information 203 with respect to the assigned chunk. At step 1604, if the number of links pointing to the assigned chunk is larger than 1, the process proceeds to step 1608. Otherwise, the process proceeds to step 1612. At step 1605, the storage controller 110 searches the pool information 203 for an unused chunk and obtains the unused chunk. At step 1606, the storage controller 110 updates the write data information 202 and pool information 203 to assign the chunk to the target segment. At step 1607, the storage controller 110 stores the new data in the chunk. After that, the process proceeds to step 1701 in FIG. 15. At step 1608, the storage controller 110 searches the pool information 203 for an unused chunk and obtains the unused chunk. At step 1609, the storage controller 110 updates the write data information 202 by changing the assignment of the chunk for the target segment to the newly obtained chunk. At step 1610, the storage controller 110 updates the pool information 203 by subtracting 1 from the number of links pointing to the old chunk for the target segment. At step 1611, the storage controller 110 stores the new data in the new chunk. After that, the process proceeds to step 1701 in FIG. 15. At step 1612, the storage controller 110 stores the new data in the assigned chunk. After that, the process proceeds to step 1701 in FIG. 15.

Figure 15:
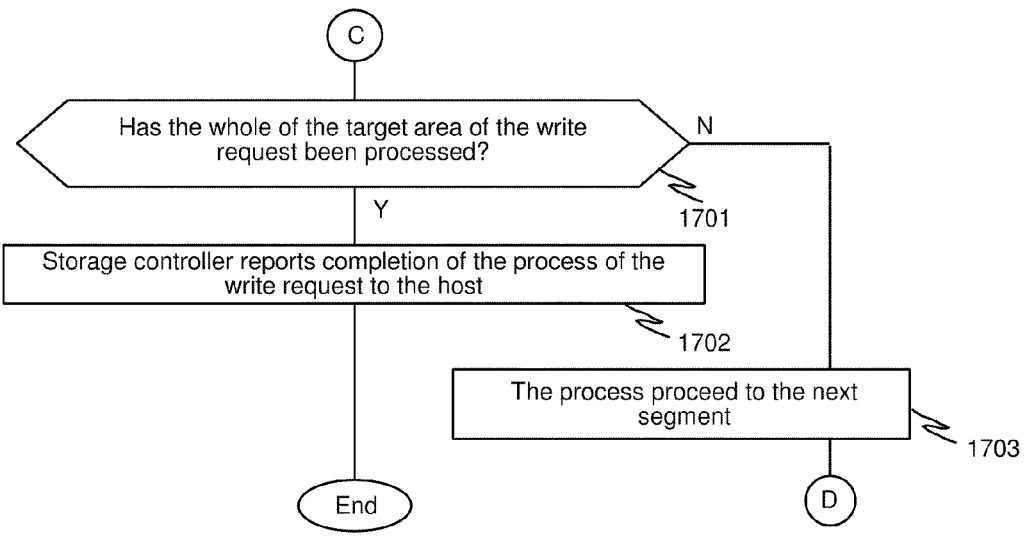
FIG. 15 is a flow diagram illustrating the fourth part of the exemplary write process.

FIG. 15 illustrates the fourth part of the exemplary write process. This figure describes the termination condition of the process. At step 1701, if the whole of the target area of the write request has been processed, the storage controller 110 reports completion of the process of the write request to the host 500 (step 1702), and the process terminates. Otherwise, the storage controller 110 designates the next segment as the target segment (step 1703), and then the process proceeds to step 1402 in FIG. 12. In the above process, deduplication is performed in the range of the group 700 that having the target snapshot 650.

I. Read Process For Writable Snapshot

Figure 16:
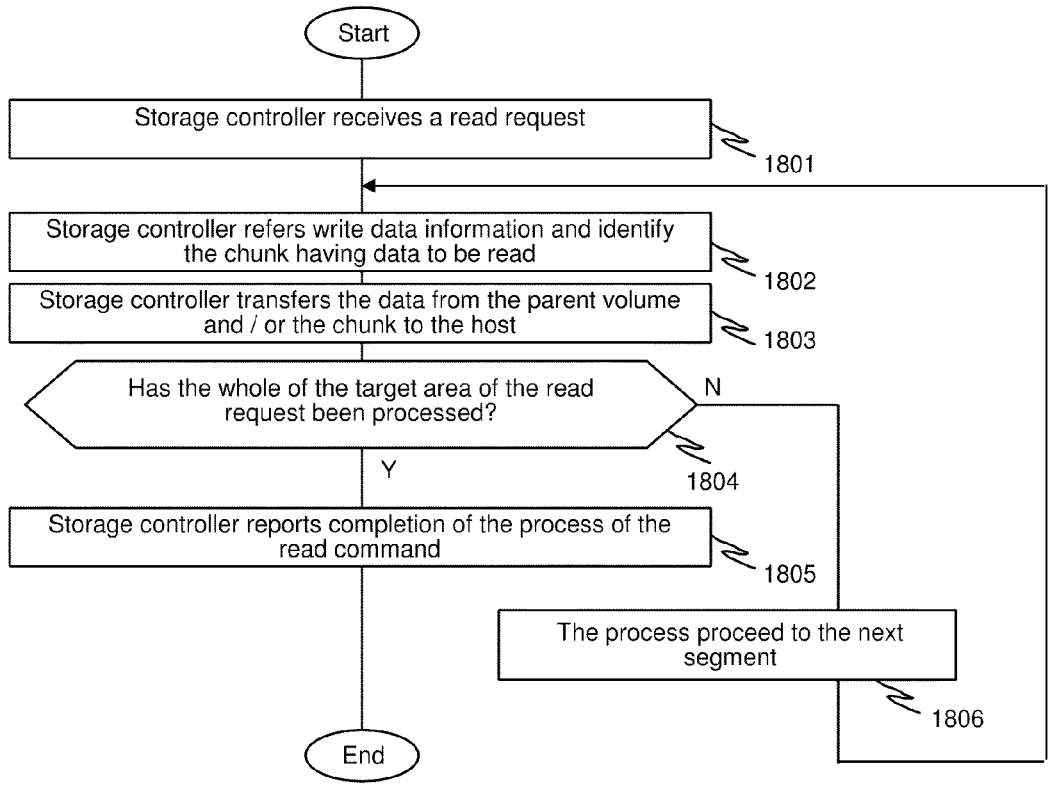
FIG. 16 is a flow diagram illustrating an exemplary embodiment of a process for a read request regarding a snapshot.

FIG. 16 illustrates an exemplary embodiment of a process for a read request regarding a snapshot 650. At step 1801, the storage controller 110 receives a read request for a snapshot 650 from the host 500 via the SAN 900. The storage controller 110 designates the first segment of target area corresponding to the read request as the current target segment to be processed. At step 1802, the storage controller 110 refers to the write data information 202 and identifies the chunk storing data to be read. At step 1803, the storage controller 110 transfers the data from the parent volume 610 and/or the chunk to the host 500. At step 1804, if the entire target area corresponding to the read request has been processed, the storage controller 110 reports the completion of the process of the read request to the host (step 1805), and terminates the process. Otherwise, the storage controller 110 designates the next segment as the target segment (step 1806), and then the process proceeds to step 1802.

J. Deduplication Process As A Post Process

Deduplication of data stored in storage system 100 can be performed independently of the write process. That is, deduplication can be performed as a post process after storing the data.

Figure 17:
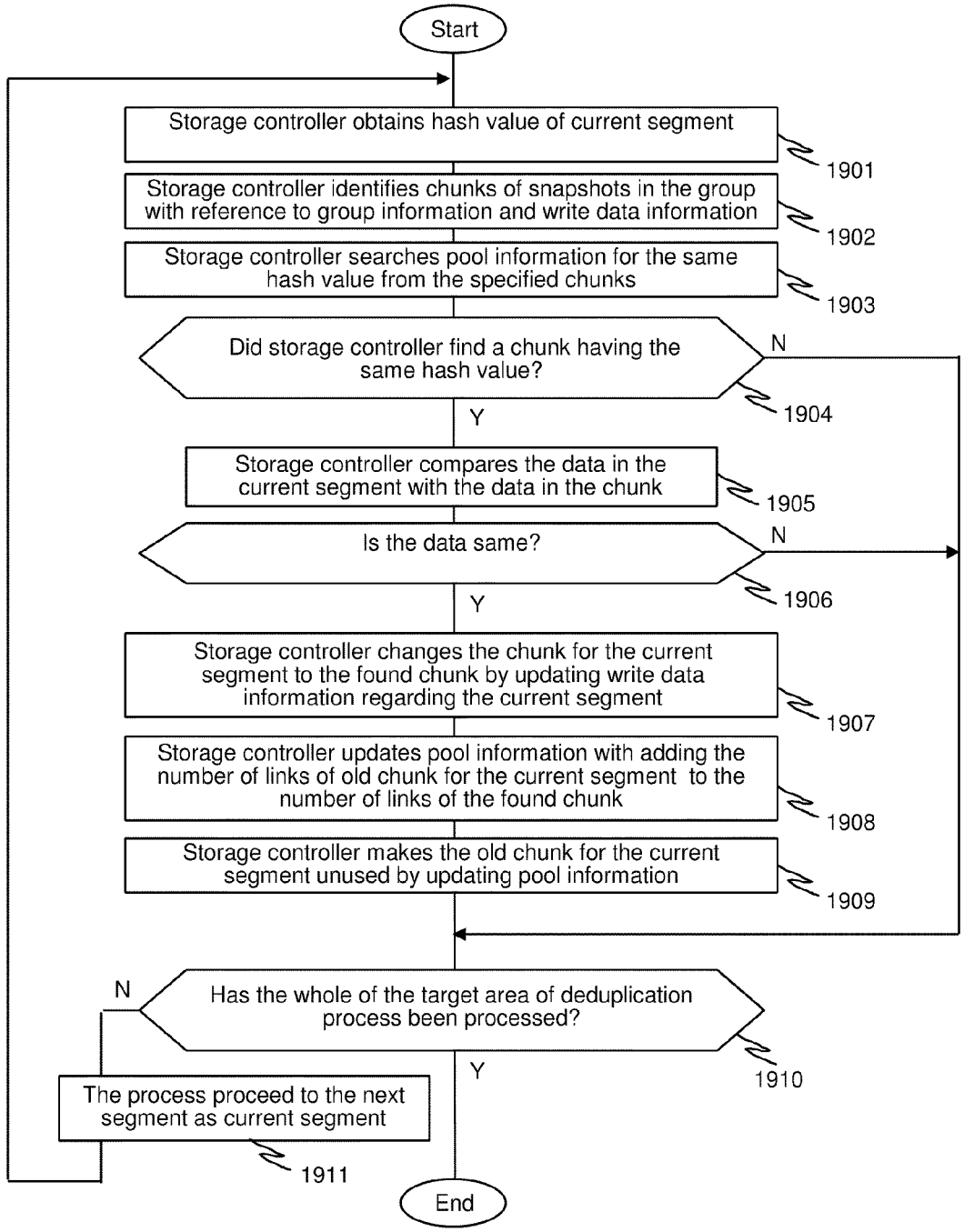
FIG. 17 is an example of a flow diagram illustrating the deduplication process as a post process.

FIG. 17 illustrates the deduplication process as a post process. At step 1901, the storage controller 110 calculates a hash value of data stored in a chunk corresponding to the current segment using the hash function. At step 1902, the storage controller 110 identifies chunks of snapshots 650 in the group 700 of the current snapshot 650 under examination with reference to the write data information 202 and group information 204. At step 1903, the storage controller 110 searches the pool information 203 for the same hash value from the specified chunks. At step 1904, if the storage controller 110 finds a chunk having the same hash value, the process proceeds to step 1905. Otherwise, the process proceeds to step 1910. At step 1905, the storage controller 110 compares the data in the current segment with the data in the found chunk using a binary-level comparison. At step 1906, if, based on the comparison, it is determined that both data are the same, the process proceeds to step 1907. Otherwise, the process proceeds to step 1910. At step 1907, the storage controller 110 updates the write data information 202 by changing the chunk for the current segment to the found chunk having the same data. At step 1908, the storage controller 110 updates the pool information 203 by adding the number of links of the old chunk for the current segment to the number of links of the found chunk having the same data. At step 1909, the storage controller 110 updates the pool information 203 by labeling the old chunk unused. At step 1910, if the whole of the target area of the deduplication process has been processed, the process terminates. Otherwise, the storage controller 110 designates the next segment as the current segment (step 1911), and after that, the process proceeds to step 1901. Also in the above process, deduplication is performed in the range of each group 700.

K. Use of Group Information Outside Storage System

The management computer 520 also can maintain information regarding groups 700 by tracking group operations performed by the management computer 520 or by acquiring the group information 204 from the storage systems 100. This information regarding the groups 700 can be utilized by another deduplication system as the scope of deduplication. For example, other types of deduplication systems such as a virtual tape library and a backup server mentioned in U.S. Patent Publication US2009/0132619 can perform the deduplication process with a range based on the groups 700 by sharing the information with the management computer 520 (or storage system 100 directly).

In addition to the volume-based snapshots mentioned above, deduplication based on the groups 700 described above can be applied to file-based snapshots (i.e., snapshots managed from perspective of files) provided with well-known methods as another example of the form of snapshot. In this case, a virtual server image may be handled as a file. In addition to virtual snapshots, deduplication based on the groups 700 described above can be applied to actual replication (copies of data) because also the copies may have parent-child relationship (i.e., ancestry or family tree) as mentioned above.

Figure 18:
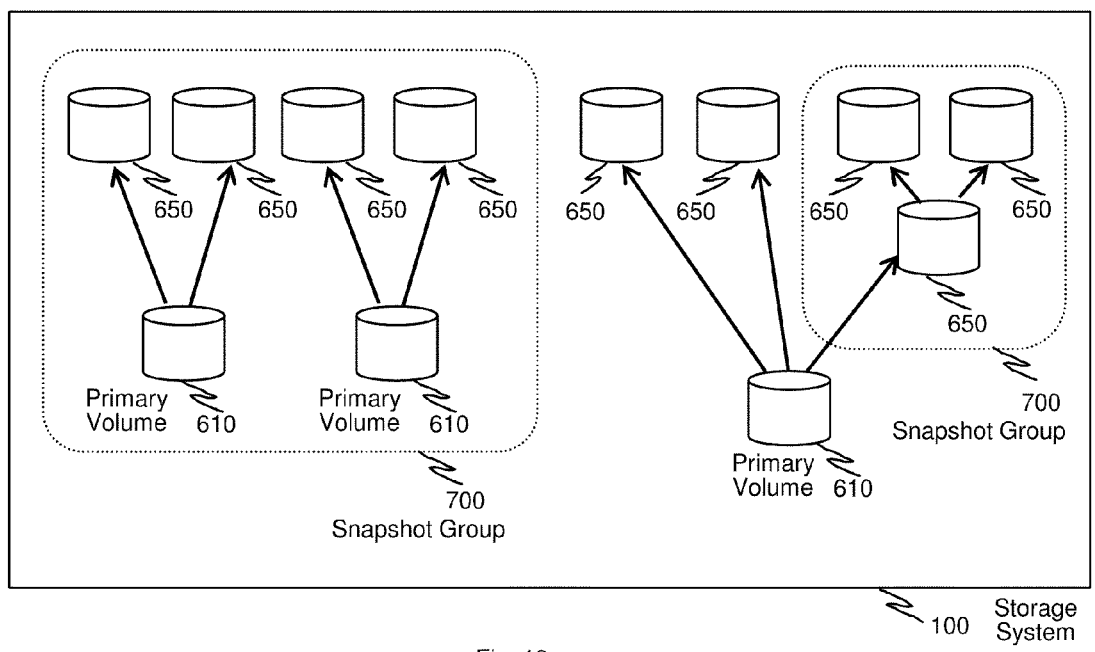
FIG. 18 is a schematic diagram illustrating a storage system for providing a group including multiple independent families of snapshot and a group consisting of a part of a family.

In addition to the examples explained above, as other examples, group configurations such as a group 700 including multiple independent families of snapshot and a group 700 consisting of a part of a family can be used as shown in FIG. 18. Likewise, a collection of multiple parts of multiple families may form a single group 700. Moreover, the storage system 100 may provide management interface to add/delete a designated snapshot 650 to/from a specified group 700.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for the management of scope of deduplication. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
one or more pool volumes having chunks for storing data;
one or more primary volumes;
a plurality of writable snapshots as virtual volumes for each primary volume which is a common ancestor of the writable snapshots, each primary volume and corresponding writable snapshots being members forming a snapshot group; and
a storage controller which includes a processor, a memory storing, for each snapshot group, group information of the members within the snapshot group, and a deduplication module to identify a snapshot group for deduplication based on the group information, and to perform deduplication of data for the identified snapshot group in a deduplication area.

2. The storage system according to claim 1,
wherein the storage controller calculates hash values of the chunks of the one or more pool volumes corresponding to the writable snapshots in the identified snapshot group; and
wherein the deduplication area is associated with a chunk of the one or more pool volumes, the deduplication area being specified based on the hash value of the chunk.

3. The storage system according to claim 2, wherein, in response to a write request received by the storage system to write to a writable snapshot of the plurality of writable snapshots,
the deduplication module performs the deduplication of data in the deduplication area, for the identified snapshot group which contains the writable snapshot of the write request, if a hash value of write data for the write request is same as the hash value of the chunk of pool volume associated with the deduplication area and if the write data of the write request is same as data in the chunk of pool volume having the same hash value as the write data of the write request; and
the storage controller allocates a chunk of pool volume for the write data, if the hash value of write data of the write request does not match the hash value of any of the chunks of pool volume corresponding to the writable snapshots in the identified snapshot group.

4. The storage system according to claim 3,
wherein the deduplication module performs the deduplication of data before the storage controller stores the write data of the write request in the storage system.

5. The storage system according to claim 3,
wherein the deduplication module performs the deduplication of data after the storage controller stores the write data of the write request in the storage system.

6. The storage system according to claim 1,
wherein a snapshot group is formed by one of the writable snapshots as an ancestor snapshot and a plurality of the writable snapshots to which the ancestor snapshot is a common ancestor.

7. The storage system according to claim 6,
wherein the members of the snapshot group are changed in creation or deletion of a snapshot if the snapshot group is related to the snapshot.

8. The storage system according to claim 7,
wherein when said storage controller deletes a snapshot, said storage controller checks said group information and updates said group information if said snapshot subject to deletion is included as a member of a snapshot group.

9. The storage system according to claim 7,
wherein when said storage controller creates a snapshot, said storage controller checks said group information and updates said group information to add said created snapshot to as a member of the snapshot group.

10. The storage system according to claim 1,
wherein said plurality of writable snapshots are file-based snapshots.

11. A storage system comprising:
one or more pool volumes having chunks for storing data;
one or more primary volumes;
a plurality of writable snapshots as virtual volumes for each primary volume which is a common ancestor of the writable snapshots, each primary volume and corresponding writable snapshots being members forming a snapshot group; and
a storage controller which includes a processor, a memory storing, for each snapshot group, group information of the members within the snapshot group, and a deduplication module to perform deduplication of data in a deduplication area which is specified based on the group information of a snapshot group being generated in the storage system.

12. The storage system according to claim 11,
wherein the storage controller calculates hash values of the chunks of pool volumes corresponding to the writable snapshots in the snapshot group; and
wherein the deduplication area is specified based on the calculated hash values.

13. The storage system according to claim 12, wherein, in response to a write request received by the storage system to write to a target snapshot of the plurality of writable snapshots,
the deduplication module performs the deduplication of data in the deduplication area, for the snapshot group which contains the target snapshot of the write request, if a hash value of write data for the write request is same as the hash value of the chunk of pool volume associated with the deduplication area and if the write data of the write request is same as data in the chunk of pool volume having the same hash value as the write data of the write request; and
the storage controller allocates a chunk of pool volume for the write data, if the hash value of write data of the write request does not match the hash value of any of the chunks of pool volume corresponding to the writable snapshots in the snapshot group which contains the target snapshot.

14. The storage system according to claim 13,
wherein the deduplication module performs the deduplication of data before the storage controller stores the write data of the write request in the storage system.

15. The storage system according to claim 13,
wherein the deduplication module performs the deduplication of data after the storage controller stores the write data of the write request in the storage system.

16. The storage system according to claim 11,
wherein a snapshot group is formed by one of the writable snapshots as an ancestor snapshot and a plurality of the writable snapshots to which the ancestor snapshot is a common ancestor.

17. The storage system according to claim 16,
wherein the members of the snapshot group are changed in creation or deletion of a snapshot if the snapshot group is related to the snapshot.

18. The storage system according to claim 17,
wherein when said storage controller deletes a snapshot in response to a request from a management computer, said storage controller checks said group information and updates said group information if said snapshot subject to deletion is included as a member of a snapshot group, and sends a report to said management computer after completion of said checking and updating said group information.

19. The storage system according to claim 17,
wherein when said storage controller creates a snapshot in response to a request from a management computer, said storage controller checks said group information and updates said group information if said snapshot needs to be included as a member of a snapshot group, and sends a report to said management computer after completion of said checking and updating said group information.

20. The storage system according to claim 11,
wherein said plurality of writable snapshots are file-based snapshots.

\* \* \* \* \*